(12) United States Patent
Tikka (10) Patent No.: US 8,786,556 B2
(45) Date of Patent: Jul. 22, 2014

(54) METHOD AND APPARATUS FOR SELECTING TEXT INFORMATION

(75) Inventor: Pirkko Piiastiina Maria Tikka, Oulu (FI)

(73) Assignee: Nokia Corporation, Espoo (FI)

( * ) Notice: Subject to any disclaimer, the term of this patent is extended or adjusted under 35 U.S.C. 154(b) by 1115 days.

(21) Appl. No.: 12/402,625

(22) Filed: Mar. 12, 2009

(65) Prior Publication Data

US 2010/0231529 A1    Sep. 16, 2010

(51) Int. Cl.
*G06F 3/041*    (2006.01)

(52) U.S. Cl.
USPC ........................................................ 345/173

(58) Field of Classification Search
None
See application file for complete search history.

(56) References Cited

U.S. PATENT DOCUMENTS

| | | |
|---|---|---|
| 2007/0157085 A1 | 7/2007 | Peters |
| 2007/0257890 A1 | 11/2007 | Hotelling et al. |
| 2009/0109182 A1* | 4/2009 | Fyke et al. ................. 345/173 |
| 2009/0125848 A1* | 5/2009 | Keohane et al. ............ 715/863 |
| 2009/0228792 A1* | 9/2009 | van Os et al. .............. 715/702 |
| 2009/0228842 A1* | 9/2009 | Westerman et al. ......... 715/863 |
| 2010/0085314 A1* | 4/2010 | Kwok ......................... 345/173 |
| 2010/0088654 A1* | 4/2010 | Henhoeffer ................. 715/863 |

FOREIGN PATENT DOCUMENTS

| | | |
|---|---|---|
| EP | 1840717 A1 | 10/2007 |
| EP | 2053497 A1 | 4/2009 |
| EP | 2098947 A2 | 9/2009 |

OTHER PUBLICATIONS

"User's Guide for Nokia 6600", 2004, 145 pages.
"BlackBerry Storm Series, BlackBerry Storm 9500/9530 Smartphones Version: 5.0 User Guide", 1997-2005, 304 pages.
International Search Report and Written Opinion of the International Searching Authority from corresponding Patent Cooperation Treaty Application No. PCT/IB2010/050744, dated Jun. 23, 2010, pp. 1-16.

* cited by examiner

*Primary Examiner* — Joseph Haley
*Assistant Examiner* — Emily Frank
(74) *Attorney, Agent, or Firm* — McClure and Associates, PLLC (57) ABSTRACT

An apparatus that may include a processor configured to receive a multiple touch input comprising a first touch input relating to a first text position within a first word and a second touch input relating to a second text position, determine a first text selection point positioned outside of a word based at least in part on the first text position, determine a second text selection point positioned outside of a word based at least in part on the second text position, and select text information between the first text selection point and the second text selection point is disclosed. A corresponding method, computer readable medium, and computer program product are also disclosed.

20 Claims, 7 Drawing Sheets

METHOD AND APPARATUS FOR SELECTING TEXT INFORMATION

TECHNICAL FIELD

The present application relates generally to text information selection.

BACKGROUND

There has been a recent surge in the use of touch displays on electronic devices. Some of these devices allow a user to perform operations on text information. For example, a user may view text information, edit text information, copy text information, delete text information, select text information, and/or the like. The user may utilize the touch display when performing the operations on the text information.

SUMMARY

Various aspects of examples of the invention are set out in the claims.

According to a first aspect of the invention, an apparatus comprising a processor configured to receive a multiple touch input comprising a first touch input relating to a first text position within a first word and a second touch input relating to a second text position, determine a first text selection point positioned outside of a word based at least in part on the first text position, determine a second text selection point positioned outside of a word based at least in part on the second text position, and select text information between the first text selection point and the second text selection point is disclosed.

According to a second aspect of the invention, a method comprising receiving a multiple touch input comprising a first touch input relating to a first text position within a first word and a second touch input relating to a second text position, determining a first text selection point positioned outside of a word based at least in part on the first text position, determining a second text selection point positioned outside of a word based at least in part on the second text position, and selecting text information between the first text selection point and the second text selection point is disclosed.

According to a third aspect of the invention, a computer-readable medium encoded with instructions that, when executed by a computer, perform receiving a multiple touch input comprising a first touch input relating to a first text position within a first word and a second touch input relating to a second text position, determining a first text selection point positioned outside of a word based at least in part on the first text position, determining a second text selection point positioned outside of a word based at least in part on the second text position, and selecting text information between the first text selection point and the second text selection point is disclosed.

According to a fourth aspect of the invention, a computer program product comprising a computer-readable medium bearing computer program code embodied therein for use with a computer, the computer program code comprising code for receiving a multiple touch input comprising a first touch input relating to a first text position within a first word and a second touch input relating to a second text position, code for determining a first text selection point positioned outside of a word based at least in part on the first text position, code for determining a second text selection point positioned outside of a word based at least in part on the second text position, and code for selecting text information between the first text selection point and the second text selection point is disclosed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1A through 6 of the drawings.

In an example embodiment, an apparatus displays a visual representation of text information to a user. The text information may comprise at least one character, such as a letter, a symbol, a number, a space, a control character, a punctuation character, and/or the like. The apparatus may represent text information in one or more rows, columns, and/or the like. The arrangement of the text information represented may vary. For example, the apparatus may represent text information in one or more rows where the apparatus represents the text information progressively from left to right within a row, and from top to bottom across rows. In another example, the apparatus may represent text information in one or more columns where the apparatus represents the text information progressively from top to bottom in a column, and from right to left across columns.

In an example embodiment, a text position relates to a position within a sequence of characters that comprise text information. For example, a text position may relate to a position preceding the first character in the text information. In another example, a text position may relate to a position between two adjacent characters in the text information. In still another example, a text position may relate to a position following the last character of the text information. In yet another example, a text position may relate to the position of a character in the text information.

In an example embodiment, a user may select part, or all of the represented text information. For example, a user may select at least part of one or more rows of text information, at least part of one or more columns of text information, and/or the like. The text selection may comprise one or more characters.

In an example embodiment, the text selection relates to text information between two or more text selection points. Each text selection point may relate to a text position within the text information. For example, an apparatus may interpret text information between a text selection point denoting a text position and a different text selection point denoting a different text position.

In an example embodiment, an apparatus indicates selected text information by representing the selected text information differently than the non-selected text information. For example, the apparatus may indicate the representation of selected text information by highlighting it, changing its color, changing its font, and/or the like.

In an example embodiment, a user selects text information to facilitate one or more operations on the text. For example, an apparatus may allow the user edit selected text information by performing an operation such as copying, cutting, replacing, deleting, changing color, changing font, and/or the like.

Figure 1A:
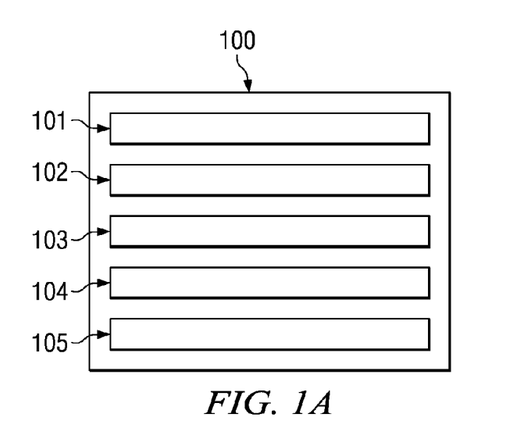
FIGS. 1A-1C are diagrams illustrating visual representations of selected text information according to an example embodiment of the invention.
Figure 1B:
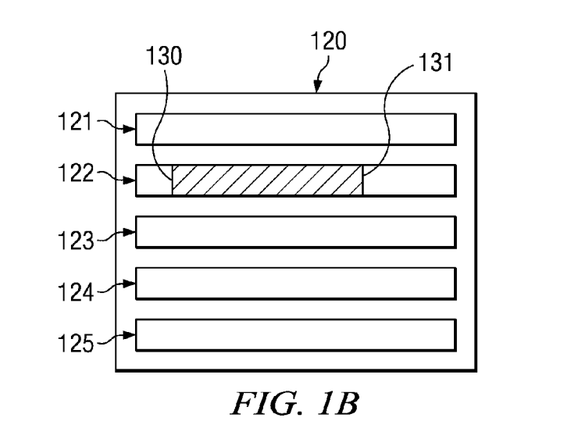
Figure 1C:
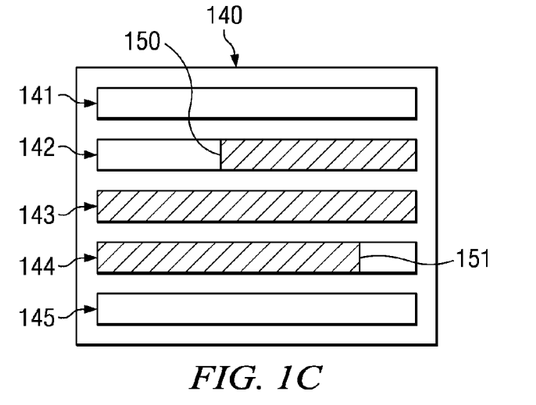

FIGS. 1A-1C are diagrams illustrating visual representations of selected text information according to an example embodiment of the invention. Although the examples of FIGS. 1A-1C indicate a text representation where an apparatus represents text progressively from left to right within a row and from top to bottom across rows, this text representation is merely an example and does not limit the scope of the invention.

FIG. 1A is a diagram illustrating a visual representation 100 of text information according to an example embodiment of the invention. Blocks 101-105 represent rows of text information. In the example of FIG. 1A, the apparatus is not representing selected text information.

FIG. 1B is a diagram illustrating a visual representation 120 of selected text information according to an example embodiment of the invention. Blocks 121-125 represent rows of text information. The visual representation of text information between text selection point representation 130 and text selection point representation 131 relates to selected text information.

FIG. 1C is a diagram illustrating a visual representation 140 of selected text information according to an example embodiment of the invention. Blocks 141-145 represent rows of text information. The visual representation of text information between text selection point 150 and text selection point 151 relates to selected text information. The selected text information relates to text information represented by row 142 to the right of text selection point 150, text information represented by row 143, and text information represented by row 144 to the left of text selection point 151.

In an example embodiment, an apparatus interprets text information based, at least in part, on characters comprising words and word separators. The characters an apparatus interprets as word separators may vary. For example, a word separator may relate to a space character, a control character, punctuation, symbol, and/or the like that may denote a word boundary. A word may relate to at least one non-separator character surrounded by separator characters. However, other factors, such as the beginning of text information or the end of text information, may relate to a word boundary. For example, the apparatus may interpret three alphanumeric characters preceded by a space character and followed by a period as a word. In another example, the apparatus may interpret seven alphabetic characters at the beginning of text information followed by a hyphen as a word. In still another example, the apparatus may interpret 23 numeric characters at the end of text information preceded by a space as a word.

In an example embodiment, the apparatus varies inclusion of a word separator in a text selection. For example, an apparatus may determine to include a period at the end of a text selection, but may determine not to include a space at the end of a text selection. In another example, the apparatus may base the determination whether to include a word separator on the context of the text selection. For example, if a text selection relates to a complete sentence, the apparatus may include punctuation at the end of the sentence in the text selection. In another example, if a text selection relates to part of a sentence, the apparatus may exclude punctuation at the end of the sentence.

In an example embodiment, a user may benefit from using an apparatus that determines text selection points with regard to words. For example, a user of an apparatus with a touch display may have difficulty providing input accurate enough for the device to select words desired by the user for selection. In such an example, a user may inadvertently exclude part of a desired word, or include part of an undesired word within the text selection. In such circumstances, the user may benefit if the apparatus determines the selection point with regard to words within the text information.

In an example embodiment, an apparatus selects text information with regard to words. For example, an apparatus may determine text selection points so that they have a text position outside of a word. In such an example, the determined text selection point outside of a word may be at the beginning and/or end of the word and/or the beginning and/or end of a different word. Furthermore, an apparatus may vary determination basis across various text selection points. For example, the apparatus may determine a text selection point using a basis, and determine a different text selection point using a different basis.

In an example embodiment, a text position outside of a word relates to a text position relating to the sequence of characters comprising the text information where the text position lies at a position preceding the position of the first character of the word, or at a position following the position of the last letter of the word. For example, the text position outside of the word may be adjacent to a character in the word. In such an example, the text position outside of the word may relate to a text position immediately preceding the first character of the word. In another example, the text position outside of the word may relate to a text position that is not adjacent to a character in the word. In such an example, the text position outside of the word may be positioned following several characters that follow the last character of the word.

FIGS. 2A-2F are diagrams representing text selection according to an example embodiment of the invention. An apparatus, for example device 10 of FIG. 6, may perform operations related to the text information of FIGS. 2A-2F. Although the examples of FIGS. 2A-2F indicate a text representation where an apparatus represents text progressively from left to right within a row and from top to bottom across rows, this text representation is merely an example and does not limit the scope of the invention.

Figures 2A, 2B:
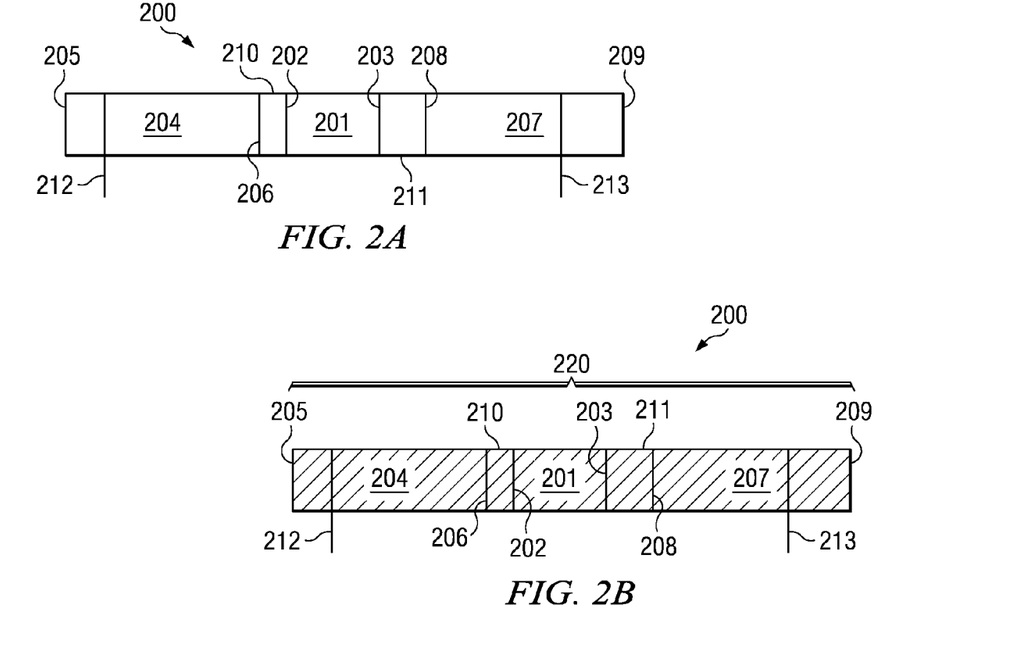
FIGS. 2A-2F are diagrams representing text selection according to an example embodiment of the invention.

FIG. 2A is a diagram representing text information 200 prior to text selection according to an example embodiment of the invention. Block 201 represents a word within text information 200 where the beginning of word 201 relates to text position 202 and the end word 201 relates to text position 203. Block 204 represents a word within text information 200 where the beginning of word 204 relates to text position 205 and the end word 204 relates to text position 206. Block 207 represents a word within text information 200 where the beginning of word 207 relates to text position 208 and the end word 207 relates to text position 209. Block 210 relates to at least one separator character beginning associated with text position 206 and ending associated with text position 202. Block 211 relates to at least one separator character beginning associated with text position 203 and ending associated with text position 208.

Text positions 212 and 213 indicate user selected text positions. For example, text positions 212 and 213 may relate to positions selected by the user by providing input related to a visual representation of text information 200. In an example embodiment, an apparatus may determine a text position as a text selection point based on various calculations, methods, and/or means. For example, the apparatus may determine a text selection point based, at least in part, on a text distance, a predetermined directive, and/or the like.

In an example embodiment, the apparatus determines a text selection point associated with a user selected text position within a word based, at least in part, on a beginning and/or an end of the word and/or a beginning and/or an end of a different word. For example, the apparatus may determine a text selection point associated with a text position, such as text position 205, related to the beginning of the word, such as word 204, associated with the user selected text position, such as user selected text position 212. In another example, the apparatus may determine a text selection point associated with a text position, such as text position 206, related to the end of the word, such as word 204, associated with the user selected text position, such as user selected text position 212. In still another example, the apparatus may determine a text selection point associated with a text position, such as text position 202, related to the beginning of a word, such as word 201, following the word associated with the user selected text position, such as user selected text position 212. In yet another example, the apparatus may determine a text selection point associated with a text position, such as text position 203, related to the end of the word, such as word 201, preceding the word associated with the user selected text position, such as user selected text position 213.

FIG. 2B is a diagram representing text selection 220 of text information 200 according to an example embodiment of the invention. Text selection 220 relates to the text information between the beginning of word 204, associated with text position 205, and the end of word 207, associated with text position 209. Therefore, text selection 220 relates to a text selection point associated with text position 205 and a text selection point associated with text position 209.

An apparatus may determine a text selection point related to user selected text position 212 associated with text position 205. The apparatus may base the determination, at least in part, on a text distance, a predetermined directive, and/or the like. For example, the apparatus may determine a text selection point associated with text position 205 based, at least in part, on a text distance associated with user selected text position 212. In such an example, the apparatus may evaluate the position related to user selected text position 212 in relation to the beginning of word 204 and/or the end of word 204. In such an example, the apparatus may determine the text selection point to relate to the closest text position outside of the word. In the preceding example, the closest text position may relate to a distance of the representation of characters, a count of characters, and/or the like. In another example, an apparatus may determine a text selection point related to text position 205 based at least in part on a predetermined directive. In such an example, the predetermined directive may indicate that the apparatus may determine a text selection point associated with the beginning of a word related to a user selected text position.

An apparatus may determine a text selection point related to user selected text position 213 associated with text position 209. The apparatus may base the determination, at least in part, on a text distance, a predetermined directive, and/or the like. For example, the apparatus may determine a text selection point associated with text position 209 based, at least in part, on a text distance related to user selected text position 213. In such an example, the apparatus may evaluate the position related to user selected text position 213 in relation to the beginning of word 207 and/or the end of word 207. In another example, an apparatus may determine a text selection point associated with text position 209 based at least in part on a predetermined directive. In such an example, the predetermined directive may indicate that the apparatus may determine a text selection point associated with the end of a word related to a user selected text position.

Figure 2C:
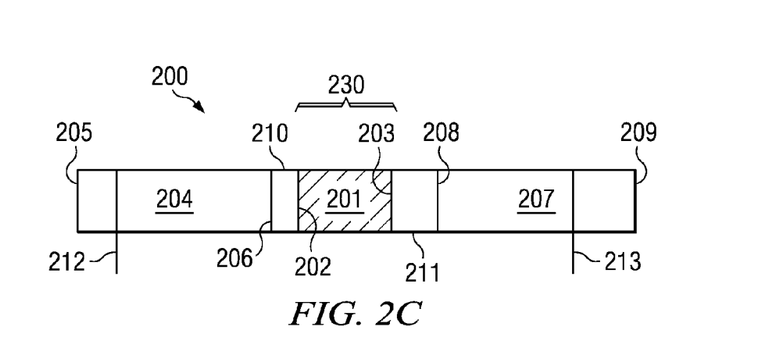

FIG. 2C is a diagram representing text selection 230 of text information 200 according to another example embodiment of the invention. Text selection 230 relates to the text information between the beginning of word 201, associated with text position 202, and the end of word 201, associated with text position 203. Therefore, text selection 230 relates to text information between a text selection point associated with text position 202 and a text selection point associated with text position 203.

An apparatus may determine a text selection point related to user selected text position 212 associated with text position 202. The apparatus may base the determination, at least in part, on a text distance, a predetermined directive, and/or the like. For example, the apparatus may determine a text selection point associated with text position 202 based at least in part on a predetermined directive. In such an example, the predetermined directive may indicate that the apparatus may determine a text selection point associated with the beginning of the word following a word related to a user selected text position.

An apparatus may determine a text selection point related to user selected text position 213 associated with text position 203. The apparatus may base the determination, at least in part, on a text distance, a predetermined directive, and/or the like. For example, an apparatus may determine a text selection point associated with text position 203 based at least in part on a predetermined directive. In such an example, the predetermined directive may indicate that the apparatus may determine a text selection point associated with the end of the word preceding a word related to a user selected text position.

Figure 2D:
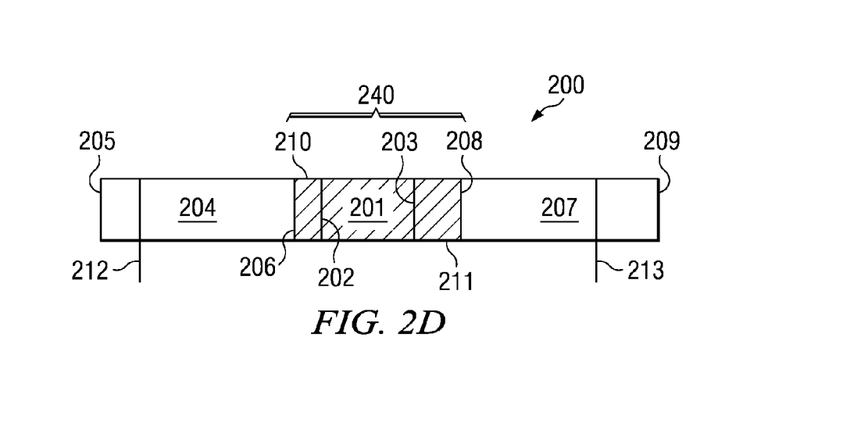

FIG. 2D is a diagram representing text selection 240 of text information 200 according to yet another example embodiment of the invention. Text selection 240 relates to the text information between the end of word 204, associated with text position 206, and the beginning of word 207, associated with text position 208. Therefore, text selection 240 relates to text information between a text selection point associated with text position 206 and a text selection point associated with text position 208.

An apparatus may determine a text selection point related to user selected text position 212 associated with text position 206. The apparatus may base the determination, at least in part, on a text distance, a predetermined directive, and/or the like. For example, the apparatus may determine a text selection point associated with text position 206 based, at least in part, on a text distance related to user selected text position 212. In such an example, the apparatus may evaluate the position related to user selected text position 212 in relation to the beginning of word 204 and/or the end of word 204. In such an example, the apparatus may determine the text selection point to relate to the closest text position outside of the word. In another example, an apparatus may determine a text selection point associated with text position 206 based at least in part on a predetermined directive. In such an example, the predetermined directive may indicate that the apparatus may determine a text selection point associated with the end of a word related to a user selected text position.

An apparatus may determine a text selection point related to user selected text position 213 associated with text position 208. The apparatus may base the determination, at least in part, on a text distance, a predetermined directive, and/or the like. For example, the apparatus may determine a text selection point associated with text position 208 based, at least in part, on a text distance related to user selected text position 213. In such an example, the apparatus may evaluate the position related to user selected text position 213 in relation to the beginning of word 207 and/or the end of word 207. In such an example, the apparatus may determine the text selection point to relate to the closest text position outside of the word. In another example, an apparatus may determine a text selection point associated with text position 208 based at least in part on a predetermined directive. In such an example, the predetermined directive may indicate that the apparatus may determine a text selection point associated with the beginning of a word related to a user selected text position.

Figure 2E:
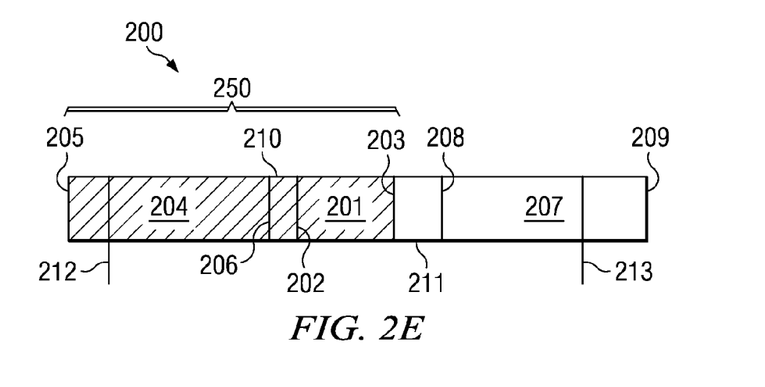

FIG. 2E is a diagram representing text selection 250 of text information 200 according to still another example embodiment of the invention. Text selection 250 relates to the text information between the beginning of word 204, associated with text position 205, and the end of word 201, associated with text position 203. Therefore, text selection 250 relates to text information between a text selection point associated with text position 205 and a text selection point associated with text position 203.

An apparatus may determine a text selection point related to user selected text position 212 associated with text position 205. The apparatus may base the determination, at least in part, on a text distance, a predetermined directive, and/or the like. For example, the apparatus may determine a text selection point associated with text position 205 based, at least in part, on a text distance related to user selected text position 212. In such an example, the apparatus may evaluate the position related to user selected text position 212 in relation to the beginning of word 204 and/or the end of word 204. In such an example, the apparatus may determine the text selection point to relate to the closest text position outside of the word. In another example, an apparatus may determine a text selection point associated with text position 205 based at least in part on a predetermined directive. In such an example, the predetermined directive may indicate that the apparatus may determine a text selection point associated with the beginning of a word related to a user selected text position.

An apparatus may determine a text selection point related to user selected text position 213 associated with text position 203. The apparatus may base the determination, at least in part, on a text distance, a predetermined directive, and/or the like. For example, an apparatus may determine a text selection point associated with text position 203 based at least in part on a predetermined directive. In such an example, the predetermined directive may indicate that the apparatus may determine a text selection point associated with the end of the word preceding a word related to a user selected text position.

Figure 2F:
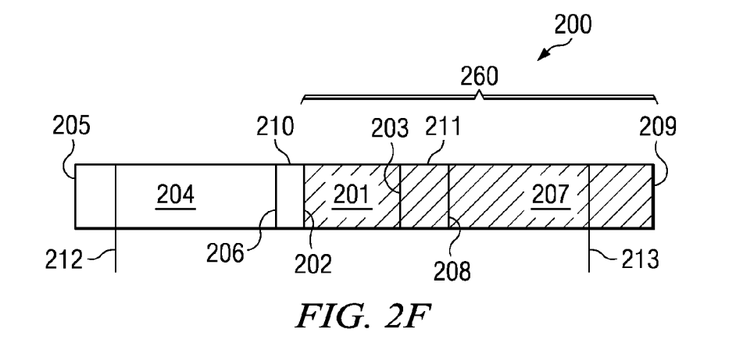

FIG. 2F is a diagram representing text selection 260 of text information 200 according to yet still another example embodiment of the invention. Text selection 260 relates to the text information between the beginning of word 201, associated with text position 202, and the end of word 207, associated with text position 209. Therefore, text selection 260 relates to text information between a text selection point associated with text position 202 and a text selection point associated with text position 209.

An apparatus may determine a text selection point related to user selected text position 212 associated with text position 202. The apparatus may base the determination, at least in part, on a text distance, a predetermined directive, and/or the like. For example, the apparatus may determine a text selection point associated with text position 202 based at least in part on a predetermined directive. In such an example, the predetermined directive may indicate that the apparatus may determine a text selection point associated with the beginning of the word following a word related to a user selected text position.

An apparatus may determine a text selection point related to user selected text position 213 associated with text position 209. The apparatus may base the determination, at least in part, on a text distance, a predetermined directive, and/or the like. For example, the apparatus may determine a text selection point associated with text position 209 based, at least in part, on a text distance related to user selected text position 213. In such an example, the apparatus may evaluate the position related to user selected text position 213 in relation to the beginning of word 207 and/or the end of word 207. In such an example, the apparatus may determine the text selection point to relate to the closest text position outside of the word. In another example, an apparatus may determine a text selection point associated with text position 209 based at least in part on a predetermined directive. In such an example, the predetermined directive may indicate that the apparatus may determine a text selection point associated with the end of a word related to a user selected text position.

Figure 3:
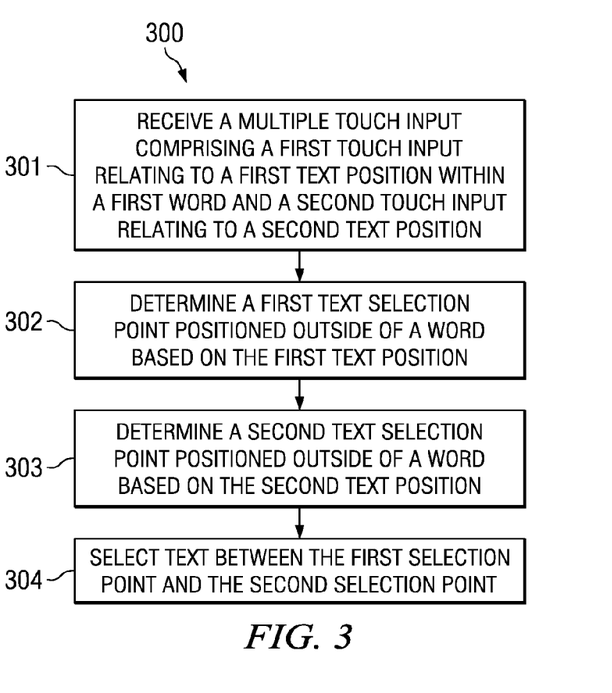
FIG. 3 is a flow diagram showing a set of operations for selecting text information according to an example embodiment of the invention.

FIG. 3 is a flow diagram showing a set of operations 300 for selecting text information according to an example embodiment of the invention. An apparatus, for example electronic device 10 of FIG. 7, may utilize method 300. The apparatus may comprise means for performing the operations of FIG. 3. In the example of FIG. 3, the designation of first and second are used to differentiate without regard any sequential ordering, if any, and do not limit the scope of the invention. For example, an apparatus may receive a first touch input before a second touch input, after a second touch input, concurrently with a second touch input, and/or the like.

At Block 301, the apparatus receives a multiple touch input comprising a first touch input relating to a first text position within a word and a second touch input relating to a second text position. The multiple touch input may comprise position information, time information, speed information, and/or the like. A touch display, for example display 28, of FIG. 6, may receive the touch input. The apparatus may receive the touch input after the touch input terminates, before the touch input terminates, and/or the like. For example, the apparatus may receive the touch input while a user is performing the touch input. In another example, the apparatus may receive the touch input after the user has terminated a touch input. The apparatus may associate the touch input with a text position based at least in part on the position related to the touch input with respect to the visual representation of the text information. For example, the first touch input may relate to a press input, such as input 500 of FIG. 5A, where the position related to the contact input, such as contact input 502, relates to a position related to the visual representation of the text information that corresponds to a first text position within a word, for example text position 212 of FIG. 2A.

At Block 302, the apparatus determines a first text selection point positioned outside of a word based at least in part on the first text position. The apparatus may determine a text selection point, outside of a word, associated with a user selected text position and the beginning and/or the end of the word and/or the beginning and/or end of a different word. For example, the apparatus may determine a text selection point associated with the text position related to the beginning of the word associated with the user selected text position. In another example, the apparatus may determine a text selection point associated with the text position related to the end of the word associated with the user selected text position. In still another example, the apparatus may determine a text selection point associated with the text position related to the beginning of the word following the word associated with the user selected text position. In yet another example, the apparatus may determine a text selection point associated with the text position related to the end of the word preceding the word associated with the user selected text position.

In an example embodiment, the apparatus bases the determination, at least in part, on a text distance, a predetermined directive, and/or the like. For example, the apparatus may determine a text selection point at a text position, for example text position 205 of FIG. 2B, based, at least in part, on a text distance associated with the first text position. In such an example, the apparatus may evaluate the first text position in relation to the beginning of the word associated with the first text position, for example word 204, and/or the end of the word. In another example, the apparatus may determine a text selection point at a text position, for example text position 205 of FIG. 2B, based at least in part on a predetermined directive. In such an example, the predetermined directive may indicate for the apparatus to determine a text selection point at the beginning of the word associated with the first text position, the end of the word associated with the first text position, the beginning of a word following the word associated with the first text position, the end of a word preceding the word associated with the first text position, and/or the like. The predetermined directive may relate to a setting, a processor instruction, and/or the like.

At Block 303, the apparatus determines a second text selection point positioned outside of a word based at least in part on the second text position. The determination of the second text selection point is similar as described with reference to block 302. However, the basis of the determination of the second text selection point may differ from the determination of the first selection point. For example, the first text selection point may be determined based on a text distance and the second text selection point may be determined based on a predetermined directive.

At Block 304, the apparatus selects text information between the first text selection point and the second text selection point, for example text selection 240 of FIG. 2D.

In an example embodiment, the multiple touch input of block 301 may further comprise a third touch input and a fourth touch input. In such an example, the apparatus may determine text selection points and perform text selection according to these further inputs. For example, the apparatus may perform a text selection associated with the first touch input and the second touch input and perform an additional text selection associated with the third touch input and the fourth touch input.

In an example embodiment, the apparatus may modify text selection based at least in part on a change in one or more touch input. For example, if the apparatus receives one or more movement inputs associated with one or more contact inputs, the apparatus may determine one or more text selection points based at least in part on the one or more movement inputs. In such an example, the apparatus may perform text selection based at least in part on this determination of text selection points.

Figures 4, 4A:
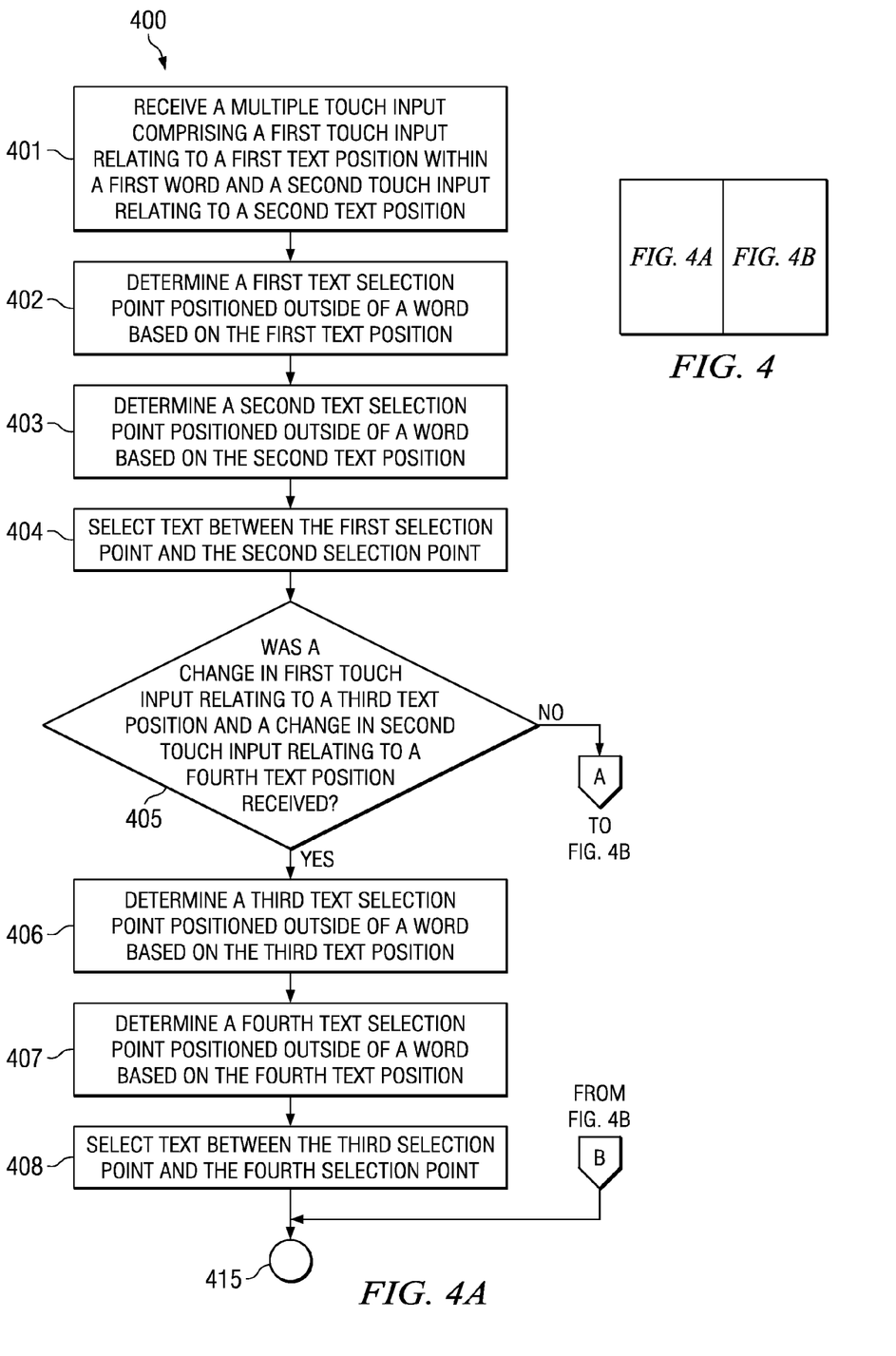
FIG. 4 is another flow diagram showing a set of operations for selecting text information according to an example embodiment of the invention.
Figure 4B:
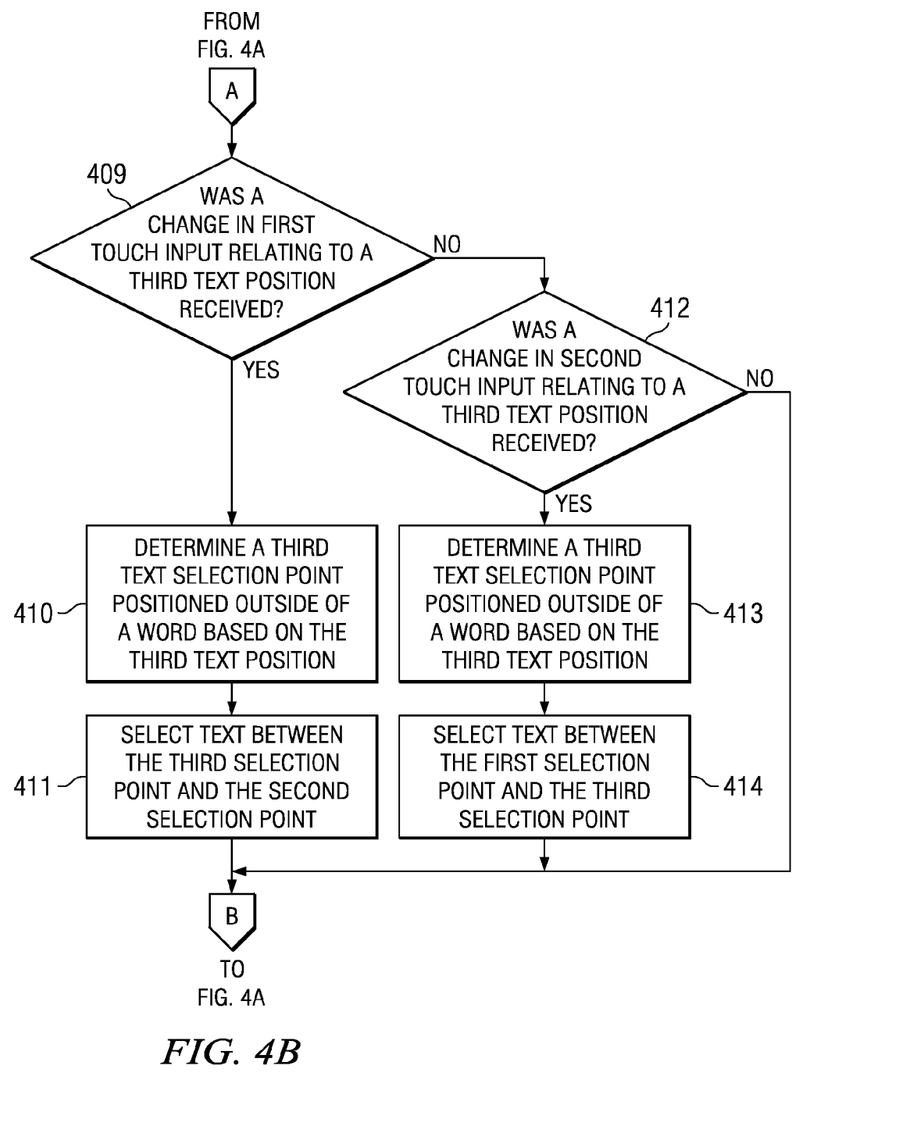

FIG. 4 is another flow diagram showing a set of operations 400 for selecting text information according to an example embodiment of the invention. An apparatus, for example electronic device 10 of FIG. 7, may utilize method 400. The apparatus may comprise means for performing the operations of FIG. 3. In the example of FIG. 4, the designation of first, second, third, and fourth are used to differentiate without regard any sequential ordering, if any, and do not limit the scope of the invention. For example, an apparatus may receive a first touch input before a second touch input, after a second touch input, concurrently with a second touch input, and/or the like.

At Block 401, the apparatus receives a multiple touch input comprising a first touch input relating to a first text position within a first word and a second touch input relating to a second text position. The input, receiving, and text positions may be similar as described with reference to block 301 of FIG. 3.

At Block 402, the apparatus determines a first text selection point positioned outside of a word based at least in part on the first text position. The determination may be similar as described with reference to block 302 of FIG. 3.

At Block 403, the apparatus determines a second text selection point positioned outside of a word based at least in part on the second text position. The determination may be similar as described with reference to block 303 of FIG. 3.

At Block 404, the apparatus selects text information between the first text selection point and the second text selection point. The selection may be similar as described with reference to block 304 of FIG. 3.

At block 405, the apparatus determines whether it received a change in the first touch input relating to a third text position and a change in the second touch input relating to a fourth text position. If, at block 405, the apparatus determines that it did not receive a change in the first touch input relating to a third text position and a change in the second touch input relating to a fourth text position, the apparatus proceeds to block 409. Otherwise, the apparatus proceeds to block 406. The change in touch input may relate to a movement input, such as movement input 544 of FIG. 5C. For example, the first and second touch inputs may relate to contact inputs, such as contact inputs 582 and 588 of FIG. 5. In such an example, the change in the first touch input and the second touch input may relate to movement inputs, such as movement inputs 584 and 590, respectively, of FIG. 5.

At block 406, the apparatus determines a third text selection point positioned outside of a word based at least in part on the third text position. The determination may be similar as described with reference to block 302 of FIG. 3.

At block 407, the apparatus determines a fourth text selection point positioned outside of a word based at least in part on the second text position. The determination may be similar as described with reference to block 303 of FIG. 3.

At block 408, the apparatus selects text information between the third text selection point and the fourth text selection point, before exiting the flow at block 415. The selection may be similar as described with reference to block 304 of FIG. 3.

In circumstances where the apparatus determined at block 405 that the first and second touch inputs did not both change to now relate to third and fourth text positions, respectively, at block 409, the apparatus determines whether it received a change in the first touch input relating to a third text position. If at block 409, the apparatus determines that it did not receive a change in the first touch input relating to a third text position, the apparatus proceeds to block 412. Otherwise, the apparatus proceeds to block 410. The change in the first touch input may be similar as described with reference to block 405.

At block 410, the apparatus determines a third text selection point located outside of a word based at least in part on the third text position. The determination may be similar as described with reference to block 302 of FIG. 3.

At block 411, the apparatus selects text information between the third text selection point and the second text selection point, before exiting the flow at block 415. The selection may be similar as described with reference to block 304 of FIG. 3.

In circumstances where the apparatus determined at block 409 that the first touch input did not change to now relate to a third text position, at block 412, the apparatus determines whether it received a change in the second touch input relating to a third text position. If, at block 412, the apparatus determines that it did not receive a change in the second touch input relating to a third text position, the apparatus exits the flow at block 415. Otherwise, the apparatus proceeds to block 413. The change in the second touch input may be similar as described with reference to block 405.

At block 413, the apparatus determines a third text selection point located outside of a word based at least in part on the third text position. The determination may be similar as described with reference to block 303 of FIG. 3.

At block 414, the apparatus selects text information between the first text selection point and the third text selection point, before exiting the flow at block 415. The selection may be similar as described with reference to block 304 of FIG. 3.

Figure 5A:
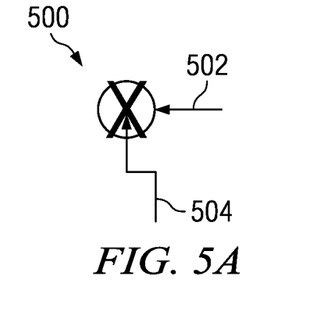
FIGS. 5A-5E are diagrams illustrating input from a touch display according to an example embodiment of the invention.
Figure 5B:
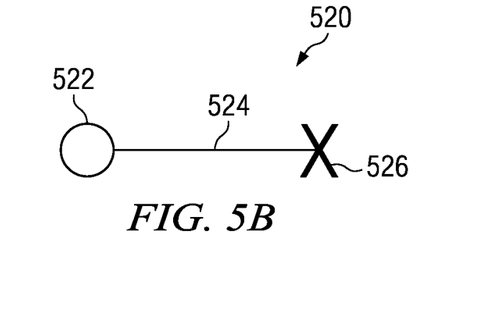
Figure 5C:
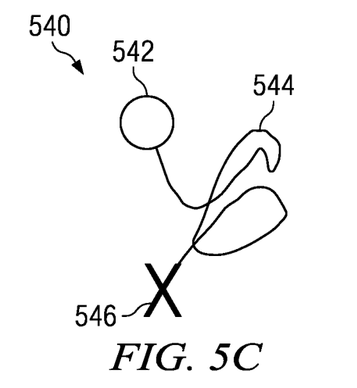
Figure 5D:
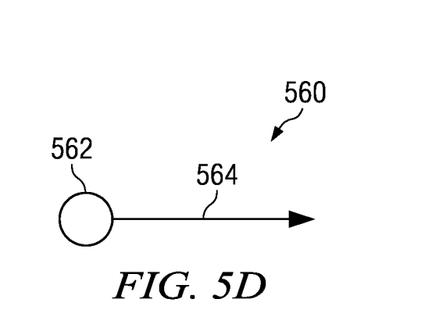
Figure 5E:
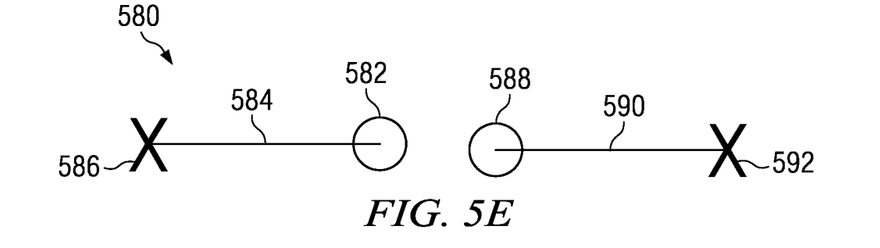
Figure 6:
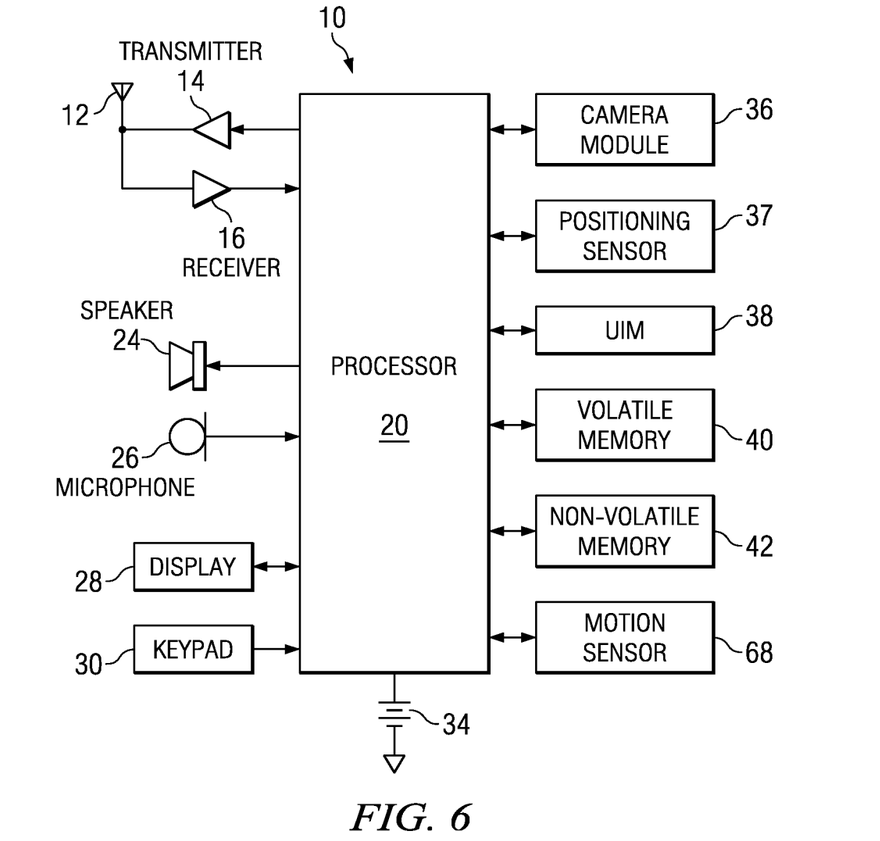
FIG. 6 is a block diagram showing an apparatus according to an example embodiment of the invention.

FIGS. 5A-5E are diagrams illustrating input from a touch display, for example from display 28 of FIG. 6, according to an example embodiment of the invention. In FIGS. 5A-5E, a circle represents an input related to contact with a touch display, two crossed lines represent an input related to releasing a contact from a touch display, and a line represents input related to movement on a touch display.

In the example of FIG. 5A, input 500 relates to receiving contact input 502 and receiving a release input 504. In this example, contact input 502 and release input 504 occur at the same position. In an example embodiment, an apparatus utilizes the time between receiving contact input 502 and release input 504. For example, the apparatus may interpret input 500 as a tap for a short time between contact input 502 and release input 504, as a press for a longer time between contact input 502 and release input 504, and/or the like. In such an example, a tap input may induce one operation, such as selecting an item, and a press input may induce another operation, such as performing an operation on an item. In another example, a tap and/or press may relate to a user selected text position.

In the example of FIG. 5B, input 520 relates to receiving contact input 522, a movement input 524, and a release input 526. In this example, contact input 522 and release input 526 occur at different positions. Input 520 may relate to dragging an object from one position to another, to moving a scroll bar, to panning a virtual screen, to drawing a shape, and/or the like. In an example embodiment, an apparatus interprets input 520 based at least in part on the speed of movement 524. For example, if input 520 relates to panning a virtual screen, the panning motion may be small for a slow movement, large for a fast movement, and/or the like. In another example embodiment, an apparatus interprets input 520 based at least in part on the distance between contact input 522 and release input 526. For example, if input 520 relates to a scaling operation, such as resizing a box, the scaling may relate to the distance between contact input 522 and release input 526. An apparatus may interpret the input before receiving release input 526. For example, the apparatus may evaluate a change in the input, such as speed, position, and/or the like. In such an example, the apparatus may perform one or more determinations based upon the change in the touch input. In such an example, the apparatus may modify a text selection point based at least in part on the change in the touch input.

In the example of FIG. 5C, input 540 relates to receiving contact input 542, a movement input 544, and a release input 546 are shown. In this example, contact input 542 and release input 546 occur at different positions. Input 540 may relate to dragging an object from one position to another, to moving a scroll bar, to panning a virtual screen, to drawing a shape, and/or the like. In an example embodiment, an apparatus interprets input 540 based at least in part on the speed of movement 544. For example, if input 540 relates to panning a virtual screen, the panning motion may be small for a slow movement, large for a fast movement, and/or the like. In another example embodiment, an apparatus interprets input 540 based at least in part on the distance between contact input 542 and release input 546. For example, if input 540 relates to a scaling operation, such as resizing a box, the scaling may relate to the distance between contact input 542 and release input 546. In still another example embodiment, the apparatus interprets the position of the release input. In such an example, the apparatus may modify a text selection point based at least in part on the change in the touch input.

In the example of FIG. 5D, input 560 relates to receiving contact input 562, and a movement input 564, where contact is released during movement. Input 560 may relate to dragging an object from one position to another, to moving a scroll bar, to panning a virtual screen, to drawing a shape, and/or the like. In an example embodiment, an apparatus interprets input 560 based at least in part on the speed of movement 564. For example, if input 560 relates to panning a virtual screen, the panning motion may be small for a slow movement, large for a fast movement, and/or the like. In another example embodiment, an apparatus interprets input 560 based at least in part on the distance associated with the movement input 564. For example, if input 560 relates to a scaling operation, such as resizing a box, the scaling may relate to the distance of the movement input 564 from the contact input 562 to the release of contact during movement.

In an example embodiment, an apparatus may receive multiple touch inputs at coinciding times. For example, there may be a tap input at a position and a different tap input at a different location during the same time. In another example there may be a tap input at a position and a drag input at a different position. An apparatus may interpret the multiple touch inputs separately, together, and/or a combination thereof. For example, an apparatus may interpret the multiple touch inputs in relation to each other, such as the distance between them, the speed of movement with respect to each other, and/or the like.

In the example of FIG. 5E, input 580 relates to receiving contact inputs 582 and 588, movement inputs 584 and 590, and release inputs 586 and 592. In this example, contact input 582 and 588, and release input 586 and 592 occur at different positions. Input 580 may be characterized as a multiple touch input. Input 580 may relate to dragging an object from one position to another, to moving a scroll bar, to panning a virtual screen, to drawing a shape, indicating one or more user selected text positions and/or the like. In an example embodiment, an apparatus interprets input 580 based at least in part on the speed of movements 584 and 590. For example, if input 580 relates to zooming a virtual screen, the zooming motion may be small for a slow movement, large for a fast movement, and/or the like. In another example embodiment, an apparatus interprets input 580 based at least in part on the distance between contact inputs 582 and 588 and release inputs 586 and 592. For example, if input 580 relates to a scaling operation, such as resizing a box, the scaling may relate to the collective distance between contact inputs 582 and 588 and release inputs 586 and 592.

In an example embodiment, the timing associated with the apparatus receiving contact inputs 582 and 588, movement inputs 584 and 590, and release inputs 586 and 592 varies. For example, the apparatus may receive contact input 582 before contact input 588, after contact input 588, concurrent to contact input 588, and/or the like. The apparatus may or may not utilize the related timing associated with the receiving of the inputs. For example, the apparatus may utilize an input received first by associating the input with a preferential status, such as a primary selection point, a starting position, and/or the like. In another example, the apparatus may utilize non-concurrent inputs as if the apparatus received the inputs concurrently. In such an example, the apparatus may utilize a release input received first the same way that the apparatus would utilize the same input if the apparatus had received the input second.

FIG. 6 is a block diagram showing an apparatus, such as an electronic device 10, according to an example embodiment of the invention. It should be understood, however, that an electronic device as illustrated and hereinafter described is merely illustrative of an electronic device that could benefit from embodiments of the present invention and, therefore, should not be taken to limit the scope of the present invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, cameras, video recorders, global positioning system (GPS) devices and other types of electronic systems, may readily employ embodiments of the present invention.

Furthermore, devices may readily employ embodiments of the present invention regardless of their intent to provide mobility. In this regard, even though embodiments of the present invention are described in conjunction with mobile communications applications, it should be understood that embodiments of the present invention may be utilized in conjunction with a variety of other applications, both in the mobile communications industries and outside of the mobile communications industries.

The electronic device 10 may comprise an antenna 12 (or multiple antennae) in operable communication with a transmitter 14 and a receiver 16. The electronic device 10 may further comprise a processor 20 or other processing element that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), or with fourth-generation (4G) wireless communication protocols, wireless networking protocols, such as 802.11, short-range wireless protocols, such as Bluetooth, and/or the like.

Processor 20 may comprise means, such as circuitry for implementing audio, video, communication, navigation, logic functions, and or the like, as well as for implementing embodiments of the present invention including, for example, one or more of the functions described in conjunction with FIGS. 3-5. For example, processor 20 may comprise means, such as a digital signal processor device, a microprocessor device, various analog to digital converters, digital to analog converters, and other support circuits, for performing various functions including, for example, one or more of the functions described in conjunction with FIGS. 3-5. The apparatus may perform control and signal processing functions of the electronic device 10 among these devices according to their respective capabilities. The processor 20 thus may comprise the functionality to encode and interleave message and data prior to modulation and transmission. The processor 20 may additionally comprise an internal voice coder, and may comprise an internal data modem. Further, the processor 20 may comprise functionality to operate one or more software programs, which may be stored in memory and which may, among other things, cause the processor 20 to implement at least one embodiment of the invention including, for example, one or more of the functions described in conjunction with FIGS. 3-5. For example, the processor 20 may operate a connectivity program, such as a conventional internet browser. The connectivity program may allow the electronic device 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic device 10 may comprise a user interface for providing output and/or receiving input. The electronic device 10 may comprise an output device such as a ringer, a conventional earphone and/or speaker 24, a microphone 26, a display 28, and/or a user input interface, which are coupled to the processor 20. The user input interface, which allows the electronic device 10 to receive data, may comprise one or more devices that may allow the electronic device 10 to receive data, such as a keypad 30, a touch display, for example if display 28 comprises touch capability, and/or the like. In an embodiment comprising a touch display, the touch display may be configured to receive input from a single point of contact, multiple points of contact, and/or the like. In such an embodiment, the touch display may determine input based on position, motion, speed, contact area, and/or the like.

The electronic device 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display.

In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 may comprise hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the processor 20 in the form of software for creating a digital image file from a captured image. In an example embodiment, the camera module 36 may further comprise a processing element such as a co-processor that assists the processor 20 in processing image data and an encoder and/or decoder for compressing and/or decompressing image data. The encoder and/or decoder may encode and/or decode according to a standard format, for example, a Joint Photographic Experts Group (JPEG) standard format.

The electronic device 10 may comprise one or more user identity modules (UIM) 38. The UIM may comprise information stored in memory of electronic device 10, a part of electronic device 10, a device coupled with electronic device 10, and/or the like. The UIM 38 may comprise a memory device having a built-in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a subscriber, an operator, a user account, and/or the like. For example, UIM 38 may store subscriber information, message information, contact information, security information, program information, and/or the like. Usage of one or more UIM 38 may be enabled and/or disabled. For example, electronic device 10 may enable usage of a first UIM and disable usage of a second UIM.

In an example embodiment, electronic device 10 comprises a single UIM 38. In such an embodiment, at least part of subscriber information may be stored on the UIM 38.

In another example embodiment, electronic device 10 comprises a plurality of UIM 38. For example, electronic device 10 may comprise two UIM 38 blocks. In such an example, electronic device 10 may utilize part of subscriber information of a first UIM 38 under some circumstances and part of subscriber information of a second UIM 38 under other circumstances. For example, electronic device 10 may enable usage of the first UIM 38 and disable usage of the second UIM 38. In another example, electronic device 10 may disable usage of the first UIM 38 and enable usage of the second UIM 38. In still another example, electronic device 10 may utilize subscriber information from the first UIM 38 and the second UIM 38.

Electronic device 10 may comprise a memory device including, in one embodiment, volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may comprise an EEPROM, flash memory or the like. The memories may store any of a number of pieces of information, and data. The information and data may be used by the electronic device 10 to implement one or more functions of the electronic device 10, such as the functions described in conjunction with FIGS. 4-6. For example, the memories may comprise an identifier, such as an international mobile equipment identification (IMEI) code, which may uniquely identify the electronic device 10.

Although FIG. 6 illustrates an example of an electronic device that may utilize embodiments of the present invention including those described and depicted, for example, in FIGS. 3-5, electronic device 10 of FIG. 6 is merely an example of a device that may utilize embodiments of the present invention.

Without in any way limiting the scope, interpretation, or application of the claims appearing below, a technical effect of one or more of the example embodiments disclosed herein is reducing processor operations related to text selection resulting from inaccurate user selection of text position. Another technical effect of one or more of the example embodiments disclosed herein is reducing processor operations related to text selection resulting from user difficulty in accurately providing input for a text selection point outside of a word.

Embodiments of the present invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium" may be any media or means that can contain, or store the instructions for use by or in connection with an instruction execution system, apparatus, or device, such as a computer, with one example of a computer described and depicted in FIG. 6. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising at least one processor and at least one memory including computer program code, the memory and the computer program code configured to, working with the processor, cause the apparatus to perform at least the following:
   receive a multiple touch input comprising a first touch input relating to a first text position within a first word such that the first text position relates to a text position between a first character of the first word and a last letter of the first word, and a second touch input relating to a second text position such that the second text position relates to a text position between a first character of a second word and a last letter of the second word;
   determine a first text selection point positioned outside of the first word based at least in part on the first text position being within the first word, such that the first text selection point relates to at least one of a text position preceding a first character of the first word, or a text position following a last letter of the first word;
   determine a second text selection point positioned outside of the second word based at least in part on the second text position, such that the second text selection point relates to at least one of a text position preceding a first character of the second word, or a text position following a last letter of the second word; and
   select text information between the first text selection point and the second text selection point.

2. The apparatus of claim 1, wherein the second text position is within the second word.

3. The apparatus of claim 2, wherein determination of the second text selection point positioned outside of the second word is based at least in part on the second text position being within the second word.

4. The apparatus of claim 1, wherein the memory includes computer processor is further configured to, working with the processor, cause the apparatus to determine the first text selection point based at least in part on a text distance between the first text position and a text position related to a beginning of a word.

5. The apparatus of claim 1, wherein the memory includes computer program code configured to, working with the processor, cause the apparatus to determine the first text selection point based at least in part on a text distance between the first text position and a text position related to an end of a word.

6. The apparatus of claim 1, wherein the memory includes computer program code configured to, working with the processor, cause the apparatus to determine at least one of the first text selection point or the second text selection point based at least in part on a predetermined directive.

7. The apparatus of claim 1, wherein the first text selection point relates to a text position associated with a beginning of the first word.

8. The apparatus of claim 1, wherein the first text selection point relates to a text position associated with an end of the first word.

9. The apparatus of claim 1, wherein the first text selection point relates to a text position associated with an end of a word preceding the first word.

10. The apparatus of claim 1, wherein the first text selection point relates to a text position associated with a beginning of a word following the first word.

11. The apparatus of claim 1, wherein the second text selection point relates to a text position associated with a beginning of the second word.

12. The apparatus of claim 1, wherein the second text selection point relates to a text position associated with an end of the second word.

13. The apparatus of claim 1, wherein the second text selection point relates to a text position associated with an end of a word preceding the second word.

14. The apparatus of claim 1, wherein the second text selection point relates to a text position associated with a beginning of a word following the second word.

15. The apparatus of claim 1, wherein the memory includes computer program code configured to, working with the processor, cause the apparatus to:
   receive a change in the first touch input relating to a third text position such that the third text position relates to a text position between a first character of a third word and a last letter of the third word;
   determine a third text selection point positioned outside of the third word based at least in part on the third text position being within the third word, such that the third text selection point relates to at least one of a text position preceding a first character of the third word, or a text position following a last letter of the third word; and
   select text information between the third text selection point and the second text selection point.

16. The apparatus of claim 1, wherein the memory includes computer program code configured to, working with the processor, cause the apparatus to:
   receive a change in the second touch input relating to a third text position;
   determine a third text selection point located outside of a word based at least in part on the third text position; and
   select text information between the first text selection point and the third text selection point.

17. The apparatus of claim 1, wherein the memory includes computer program code configured to, working with the processor, cause the apparatus to:
   receive a change in the first touch input relating to a third text position and a change in the second touch input relating to a fourth text position;
   determine a third text selection point positioned outside of a third word based at least in part on the third text position being within the third word;
   determine a fourth text selection point positioned outside of a fourth word based at least in part on the second text position being within the fourth word; and
   select text information between the third text selection point and the fourth text selection point.

18. A method, comprising:
   receiving a multiple touch input comprising a first touch input relating to a first text position within a first word such that the first text position relates to a text position between a first character of the first word and a last letter of the first word, and a second touch input relating to a second text position such that the second text position relates to a text position between a first character of a second word and a last letter of the second word;
   determining a first text selection point positioned outside of the first word based at least in part on the first text position being within the first word, such that the first text selection point relates to at least one of a text position preceding a first character of the first word, or a text position following a last letter of the first word;

determining a second text selection point positioned outside of the second word based at least in part on the second text position, such that the second text selection point relates to at least one of a text position preceding a first character of the second word, or a text position following a last letter of the second word; and selecting text information between said first text selection point and said second text selection point.

19. The method of claim 18, wherein the second text position is within a second word.

20. A non-transitory computer-readable medium encoded with instructions that, when executed by a computer, perform:

multiple touch input comprising a first touch input relating to a first text position within a first word such that the first text position relates to a text position between a first character of the first word and a last letter of the first word, and a second touch input relating to a second text position such that the second text position relates to a text position between a first character of a second word and a last letter of the second word;

determining a first text selection point positioned outside of the word based at least in part on the first text position being within the first word, such that the first text selection point relates to at least one of a text position preceding a first character of the first word, or a text position following a last letter of the first word;

determining a second text selection point positioned outside of the second word based at least in part on the second text position, such that the second text selection point relates to at least one of a text position preceding a first character of the second word, or a text position following a last letter of the second word; and selecting text information between said first text selection point and said second text selection point.

* * * * *